US012609585B2

(12) United States Patent
MiKail et al.

(10) Patent No.: US 12,609,585 B2
(45) Date of Patent: Apr. 21, 2026

(54) OUTER ROTOR ELECTRIC MOTOR ASSEMBLIES FOR INDUSTRIAL APPLICATIONS

(71) Applicant: ABB Schweiz AG, Baden (CH)

(72) Inventors: Rajib MiKail, Raleigh, NC (US); Will Eakins, Raleigh, NC (US); Stefan Rakuff, Raleigh, NC (US); Matthew Hetrich, Raleigh, NC (US)

( * ) Notice: Subject to any disclaimer, the term of this patent is extended or adjusted under 35 U.S.C. 154(b) by 192 days.

(21) Appl. No.: 18/507,972

(22) Filed: Nov. 13, 2023

(65) Prior Publication Data

US 2025/0158487 A1 May 15, 2025

(51) Int. Cl.
H02K 9/06 (2006.01)
H02K 21/22 (2006.01)

(52) U.S. Cl.
CPC .............. H02K 9/06 (2013.01); H02K 21/22 (2013.01)

(58) Field of Classification Search
CPC ........ H02K 9/06; H02K 21/22; H02K 1/2786; H02K 1/2791; H02K 16/04
USPC ................... 310/62, 63, 156.12–156.15, 265
See application file for complete search history.

(56) References Cited

U.S. PATENT DOCUMENTS 7,692,342 B2    4/2010  Ahn
9,800,117 B2    10/2017  Iwai

| | | | | |
|---|---|---|---|---|
| 2005/0140232 A1* | 6/2005 | Lee | ........................... | H02K 1/30 |
| | | | | 310/67 R |
| 2014/0132121 A1* | 5/2014 | Gan | ........................ | B60L 50/20 |
| | | | | 310/67 A |
| 2022/0181931 A1* | 6/2022 | Li | ............................. | H02K 9/06 |
| 2023/0093934 A1* | 3/2023 | Sung | ........................ | H02K 9/06 |
| | | | | 310/62 |
| 2024/0131917 A1* | 4/2024 | Lee | ....................... | B60K 7/0007 |

FOREIGN PATENT DOCUMENTS

| | | |
|---|---|---|
| DE | 60206829 T2 | 5/2006 |
| DE | 102013108506 A1 | 2/2015 |
| WO | 2006059874 A1 | 6/2006 |

OTHER PUBLICATIONS

"U Type", retrieved from Internet, https://store.tmotor.com/category-2-b0-motors.html.

* cited by examiner

*Primary Examiner* — Michael Andrews
(74) *Attorney, Agent, or Firm* — McCarter & English, LLP; Michael M. Gnibus

(57) ABSTRACT

An outer rotor electric motor assembly for industrial applications is provided. The outer rotor electric motor assembly includes a stator including a stator core defining a cavity, and a rotor including a wall and one or more magnets aligned along the wall. The wall is positioned outside the stator. The rotor further includes a first cover coupled with the wall and one or more fins positioned on the first cover, wherein the one or more fins are received in the cavity.

20 Claims, 10 Drawing Sheets

100-3

104

112

302

106

500

Form a Stator —502

Form a Rotor —504

Position the wall of the rotor outside the stator —506

Position the first cover of the rotor —508

OUTER ROTOR ELECTRIC MOTOR ASSEMBLIES FOR INDUSTRIAL APPLICATIONS

BACKGROUND

The field of the disclosure relates generally to electric motors, and more particularly, to outer rotor electric motor assemblies for industrial applications.

During operation of an electric motor, the major source of heat is from electric current flowing through the windings of the stator in the motor. In an outer rotor motor, the stator is positioned inside the rotor. Heat generated by the stator is largely confined in the interior of the motor, causing winding failures and thermally limiting output power. Due to the issues in heat dissipation, outer rotor motors are typically not used in industrial applications, where the motors are required to continuously operate for a relatively long period of time, such as months even years. Accordingly, known assemblies and methods are disadvantaged in some aspects in meeting the needs of industrial applications and improvements are desired.

BRIEF DESCRIPTION

In one aspect, an outer rotor electric motor assembly for industrial applications is provided. The outer rotor electric motor assembly includes a stator including a stator core defining a cavity, and a rotor including a wall and one or more magnets aligned along the wall. The wall is positioned outside the stator. The rotor further includes a first cover coupled with the wall and one or more fins positioned on the first cover, wherein the one or more fins are received in the cavity.

In another aspect, a method of assembling an outer rotor electric motor assembly for industrial applications is provided. The method includes forming a stator including a stator core, the stator core defining a cavity. The method also includes forming a rotor including a wall and one or more magnets aligned along the wall. The rotor further includes a first cover and one or more fins positioned on the first cover. The method also includes positioning the wall outside the stator and positioning the first cover such that the one or more fins are received in the cavity.

In one more aspect, a fan assembly for industrial applications is provided. The fan assembly includes an outer rotor electric motor assembly and one or more blades coupled with the outer rotor electric motor assembly. The outer rotor electric motor assembly includes a stator including a stator core defining a cavity, and a rotor including a wall and one or more magnets aligned along the wall. The wall is positioned outside the stator. The rotor further includes a first cover coupled with the wall and one or more fins positioned on the first cover, wherein the one or more fins are received in the cavity.

BRIEF DESCRIPTION OF DRAWINGS

These and other features, aspects, and advantages of the present disclosure will become better understood when the following detailed description is read with reference to the accompanying drawings in which like characters represent like parts throughout the drawings.

DETAILED DESCRIPTION

The disclosure includes outer rotor motor assemblies for industrial applications. As used herein, an outer rotor motor assembly refers to an outer rotor electric motor assembly. In the field, an outer rotor motor may also be referred to as an external rotor motor or an outrunner motor. Direct drive outer rotor motor assemblies, where the motor directly drives a mechanical load, are described herein as examples for illustration purposes only. The assemblies and methods described herein may be used for outer rotor motor assemblies in general, where the rotor is positioned outside the stator in the motor assembly. Method aspects will be in part apparent and in part explicitly discussed in the following description.

Figure 1A:
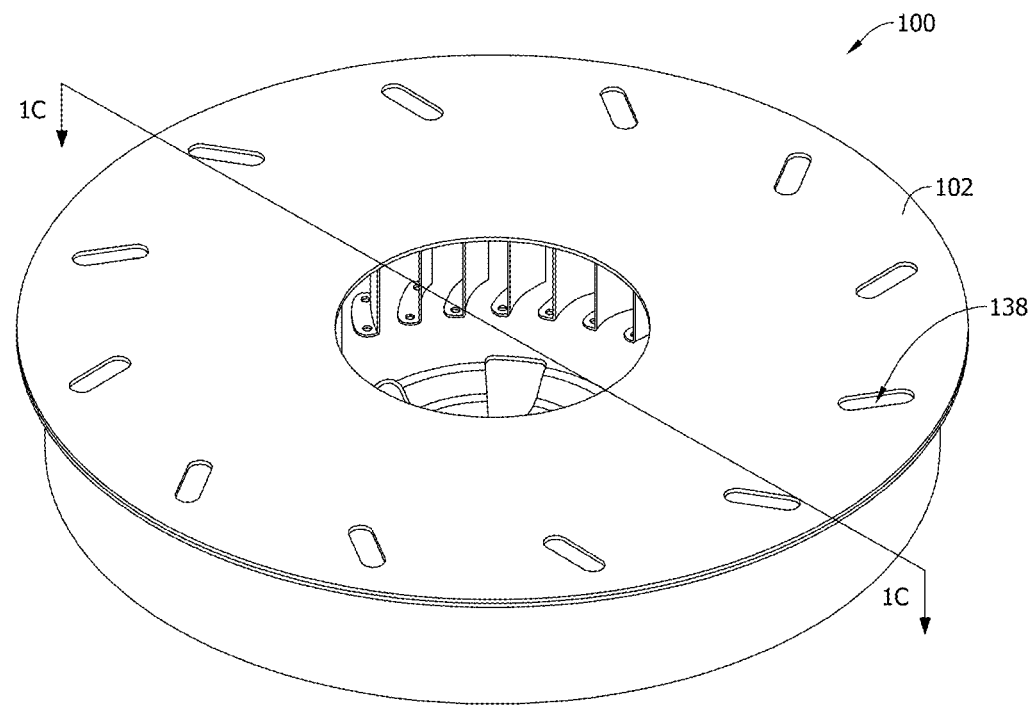
FIG. 1A is a perspective view of an example motor assembly.
Figure 1B:
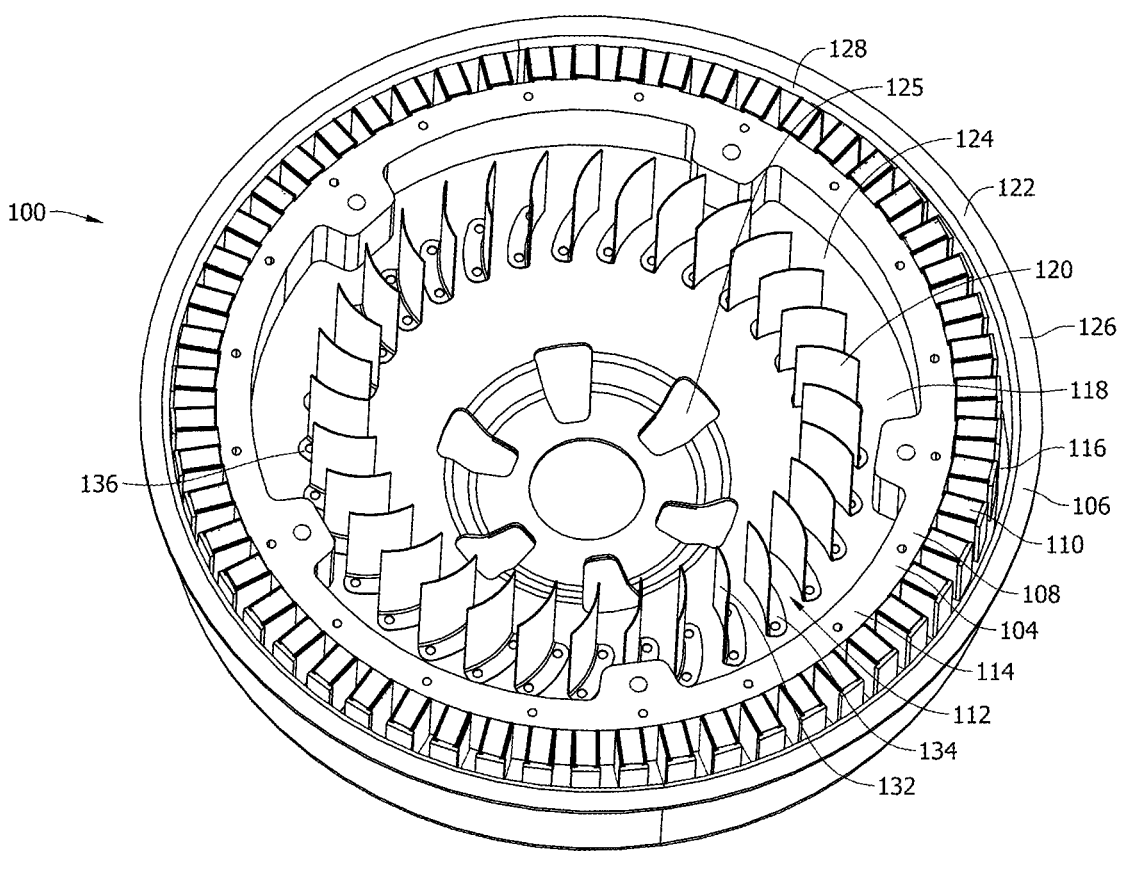
FIG. 1B is a perspective view of the motor assembly shown in FIG. 1A with a second cover removed.
Figure 1C:
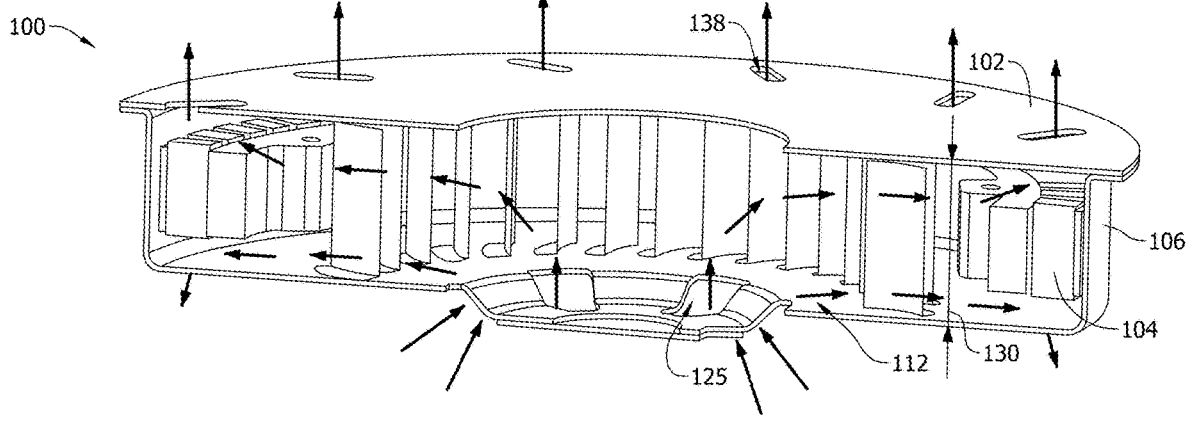
FIG. 1C is a cross-sectional view of the motor assembly shown in FIG. 1A along cross-sectional line 1C-1C as marked in FIG. 1A.
Figure 2:
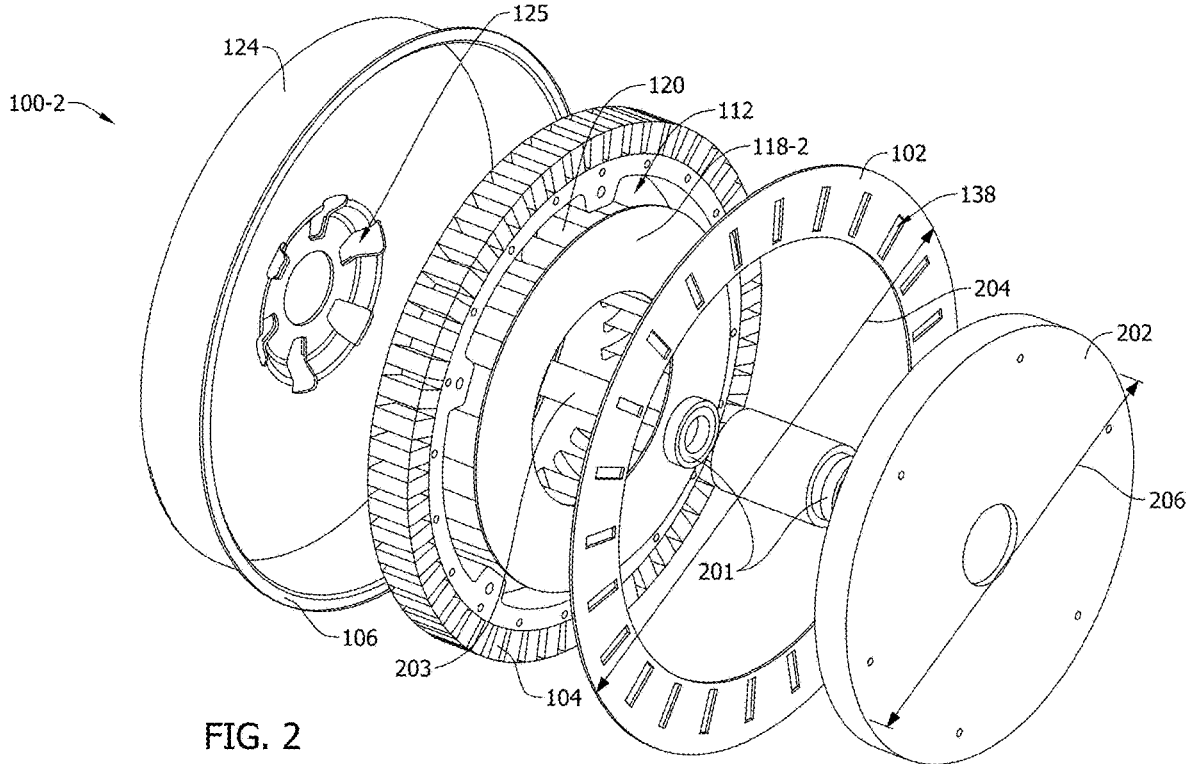
FIG. 2 is an exploded view of another example motor assembly.

FIGS. 1A-1C show an example outer rotor electric motor assembly 100. FIG. 1A is a perspective view of motor assembly 100. FIG. 1B is a perspective view of motor assembly 100 with a second cover 102 removed. FIG. 1C is a cross-sectional view of motor assembly 100 along cross-sectional line 1C-1C as marked in FIG. 1A. In the example embodiment, motor assembly 100 includes a stator 104 and a rotor 106. Rotor 106 has a rotational degree of freedom with respect to stator 104, which is enabled by a set of bearings 201 and a shaft 203 (these components are not shown in FIGS. 1A-1C but are shown in FIG. 2). A stator 104 includes a stator core 108 and windings 110. Stator 104 may form into a ring-like structure. Stator 104 defines a cavity 112 through stator 104 and. forms as the perimeter or boundary of cavity 112. Structures or components, e.g., electronics components of the motor, may be received in cavity 112. Stator core 108 includes a core body 114 and a plurality of fingers 116 extending from core body 114. Windings 110 wind around fingers 116. Electrical current flows through windings 110 when motor assembly 100 is operating.

In the example embodiment, rotor 106 includes a rotor can 122. Rotor can 122 includes an end cover 124 and a wall 126 that extends from end cover 124 at an angle with end cover 124. End cover 124 may include apertures 125. Rotor can 122 may further include second cover 102 such that wall 126 is positioned between end cover 124 and second cover 102. Rotor 106 includes one or more magnets 128 aligned along and attached to wall 126. The placement of magnets 128 is configured based on poles in motor assembly 100. Motor assembly 100 also includes a rolling element bearing arrangement (not shown) configured to facilitate rotation of rotor 106 during operation of motor assembly 100.

In operation, the direction of the current flown through windings 110 is switched either by inputting an alternate current (AC) or by switching a direct current (DC), thereby producing magnetic fields that rotate in space. The magnets 128 of rotor 106 follow the rotating magnetic fields, causing rotor 106 to rotate and generating torque from the rotation.

In the example embodiment, rotor 106 includes a first cover 118 and fins 120 coupled with first cover 118. In the depicted embodiment, end cover 124 is first cover 118, and fins 120 are coupled with end cover 124. In some embodiments, first cover 118 is a separate component from end cover 124 and positioned adjacent end cover 124. Fins 120 are positioned at a portion of first cover 118 that is radially further inward than stator 104 and are received in the radially inward space or cavity 112 defined by stator 104. Cavity 112 is unused or not fully used in a typical outer rotor motor assembly such that space remains available in cavity 112 to receive components such as fins 120. Therefore, positioning fins 120 in cavity 112 does not change the form factor or the axial length 130 of motor assembly 100. An axial length of a motor assembly is the length of the motor assembly in the axial direction. Fins 120 are positioned axially or extend axially in motor assembly 100. Fins 120 are aligned with one another axially and define gaps between neighboring fins 120. Fin 120 includes a fin body 132. In the depicted embodiment, fin 120 includes a tab 134, from which fin body 132 extends. Fin 120 is attached to first cover 118 at tab 134 via attachment mechanism such as soldering or fasteners 136 like rivets. In some embodiments, fins 120 extend directly from first cover 118. Fins 120 are cut from first cover 118 by cutting along sides of fins 120 and bending fins 120 toward the interior of the rotor can 122. Additional fin bodies 132 may be attached to the cut fins 120 to increase the overall length of fins 120.

In the example embodiment, motor assembly 100 includes a second cover 102 positioned opposite first cover 118 with stator 104 positioned between first cover 118 and second cover 102. Apertures 138 are defined in second cover 102 of motor assembly 100. Apertures 138 streamline the flow of air through motor assembly 100, improving the performance of motor assembly 100.

In operation, when motor is rotating, cool air is drawn into motor assembly 100 from one end, through apertures 125 on end cover 124 (see FIG. 1C) or apertures 138 on second cover 102. Air is directed toward stator 104 by fins 120, flows through the spacing between fins 120 and around stator 104, and exits from the other end of motor assembly 100, through apertures 138 of second cover 102 or apertures 125 on end cover 124. The air carries heat away from stator 104, thereby dissipating heat out of motor assembly 100. Further, because fins 120 are attached to rotor can 122, fins 120 rotate with rotor 106 and function as an internal fan to cool down motor assembly 100. The flow of air in motor assembly 100 is streamlined, where the increased air flow with the fins 120 functioning as a fan is along the same path and direction as the air flows through apertures 125, 138, fins 120, and stator 104.

In the depicted embodiment, fins 120 are curved with curvature oriented in one direction, such as clockwise (FIG. 1B) or counterclockwise when viewing toward first cover 118. Motor assembly 100 with curved fins 120 is more efficient to operate in one rotational direction that is the same as the curvature orientation than the other direction. In some embodiments, fins 120 are straight, where fin bodies 132 are not curved or bent. Motor assembly 100 with straight fins 120 may be bi-directional, where the rotation of motor assembly 100 may be clockwise or counterclockwise.

Motor assembly 100 is an outer rotor motor, where rotor 106 is positioned outside stator 104. In an inner-rotor motor, the rotor is positioned inside the stator and typically drives an axis to rotate. Compared to an inner-rotor motor, an outer rotor motor has a relatively large torque and a relatively short axial length, because the rotor is positioned outside the stator, A relatively short axial length is advantageous in applications because the relatively short axial length requires reduced space to accommodate the motor, thereby reducing the overall size of the equipment. Further, in equipment such as a fan, a relatively short axial length reduces the distance between the motor and a radiator, thereby increasing the efficiency of the fan.

In industrial applications, the motor often remains running continuously for a relatively long period of time, such as months or even years. The current flown through the stator generates heat when the motor is running. In an inner rotor motor, the heat generating source of the stator is positioned adjacent the exterior of the motor and heat is readily dissipated to the surrounding environment. In contrast, in an outer rotor motor, the stator is positioned in the interior of the motor and dissipation of heat generated from the stator is limited to mechanisms such as convection to the rotor can of the motor. As a result, outer rotor motors tend to become overheated and malfunction after an extended period of operation. Due to the heat dissipation issues, outer rotor motors are typically not used in industrial applications, and are limited to non-industrial applications such as appliances like washing machines, which operate only several hours a day.

In some known outer rotor motors, apertures are included in the rotor can and heat is dissipated through the apertures. The apertures only transfer out limited amounts of heat. Fins positioned on the rotor can and over the stator may be included for transferring heat from the stator out of the interior of the motor. The added fins, however, increase the axial length of the motor, trading off the advantages of a relatively short axial length of an outer rotor motor. To maintain the relatively short axial length, the fins are relatively short, limiting the transfer of heat by the fins. As a result, known outer rotor motors do not meet the need of industrial applications and are limited to non-industrial applications, despite the added features to improve heat dissipation.

In contrast, the motor assemblies described herein preserve the relatively short axial lengths of outer rotor motors by including fins at existing spaces in outer rotor motors, while maintaining the effectiveness of the motors with increased heat dissipation. Heat is effectively dissipated from the motor by mechanisms such as the fins and the streamlined air flow through the motor assembly, thereby enabling the use of outer-rotor motors in industrial applications. Using the outer rotor motor assemblies described herein to replace inner rotor motors in industrial applications is advantageous in reducing form factors of the equipment and increasing torque of the motors. Using the outer rotor motors described herein is also advantageous in reducing costs of equipment, because an outer rotor motor is typically cheaper than an inner-rotor motor.

Because outer rotor motors are typically used in non-industrial applications, the goal in manufacturing outer rotor motors is to keep the costs low. The rotor can of the outer rotor motor is manufactured with progressive stamping and punching. A metal sheet is stamped into a desired shape and apertures are punctured in the metal sheet. In known outer rotor motors, to improve heat dissipation, apertures are punched on the rotor can and the fins are created from the punched holes. The same manufacturing assembly line may therefore be used, without incurring significant increase in costs. Accordingly, a person in the field is not motivated to modify outer rotor motors assemblies by providing separate fins in the motor assemblies, because the modification requires additional materials and changes in manufacturing processes and assembly lines, increasing the costs of outer rotor motors.

In contrast, the assemblies and methods described herein are advantageous in facilitating the use of outer rotor motor assemblies in industrial applications while maintaining the advantages of out rotor motor assemblies in form factors, torque, and costs over inner rotor motors. The performances of the motor assemblies are significantly improved without changing the form factor of the motor assembly. Assembling fins into the motor assemblies do not incur significant cost increases such that the outer-rotor assemblies described herein remain relatively cheap, compared to inner rotor motors.

FIG. 2 shows another example motor assembly 100-2 in an exploded view. In the example embodiment, compared to motor assembly 100 shown in FIGS. 1A-1C, where first cover 118-2 is end cover 124 or positioned adjacent end cover 124, first cover 118-2 is positioned opposite end cover 124 with stator 104 positioned therebetween. Fins 120 are positioned on and coupled with first cover 118-2. First cover 118-2 is coupled with end cover 124. During the operation of motor assembly 100-2, fins 120 and first cover 118-2 rotate with end cover 124, thereby cooling motor assembly 100-2. Motor assembly 100 includes second cover 102 positioned opposite end cover 124 with stator 104 positioned between end cover 124 and second cover 102. Motor assembly 100 further includes a cap 202. Second cover 102 has an outer diameter 204 greater than outer diameter 206 of cap 202. Second cover 102 includes a plurality of apertures 138. Apertures 138 are sized to receive fasteners (not shown) therethrough to couple second cover 102 with stator 104, with second cover 102 positioned over stator 104. Cap 202 includes apertures sized to receive fasteners therethrough to couple cap 202 with stator 104.

In operation, when rotor 106 is rotating, air is drawn through an end of motor assembly 100-2, either through apertures 138 of second cover 102 or apertures 125 of end cover 124. Air then travels through fins 120, and out of the other end of motor assembly 100-2, either through apertures 125 on end cover 124 or apertures 138 on second cover 102. Further, fins 120 functions as an internal fan that increases the air flow in carrying heat away from stator 104 and out of motor assembly.

Figure 3:
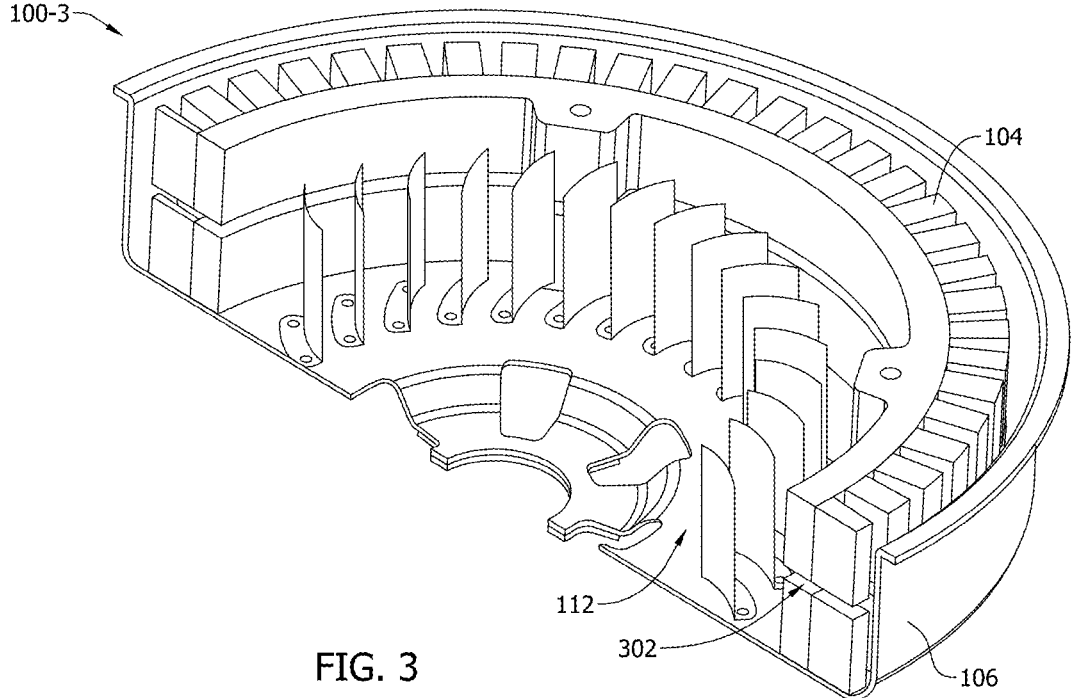
FIG. 3 is a cross-sectional view of one more example motor assembly.

FIG. 3 shows one more embodiment of motor assembly 100-3. In the example embodiment, motor assembly 100 includes a plurality of stators 104. A gap 302 is defined between neighboring stators 104. Stators 104 are aligned axially. Two stators 104 are depicted as an example. Three or more stators 104 may be included in motor assembly 100. A plurality of stacks increase the power of motor assembly 100. Gap 302 provides an additional channel to dissipate heat out of motor assembly 100 and reduces turbulence in the air flow, thereby increasing the efficiency in heat dissipation.

Figure 4A:
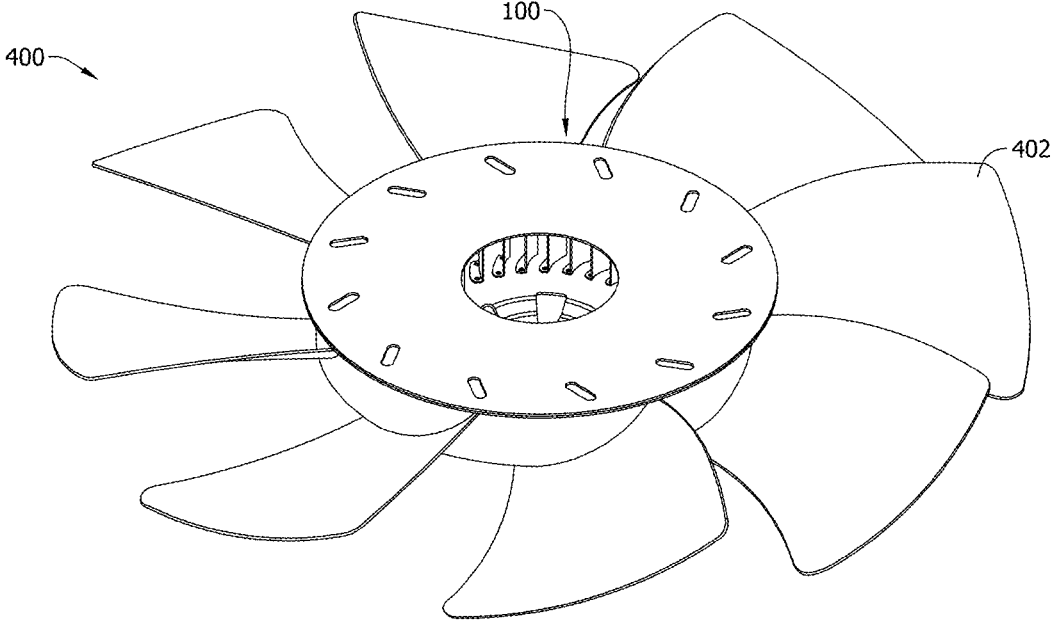
FIG. 4A is a perspective view of an example fan assembly installed with the motor assembly shown in FIGS. 1-3.
Figure 4B:
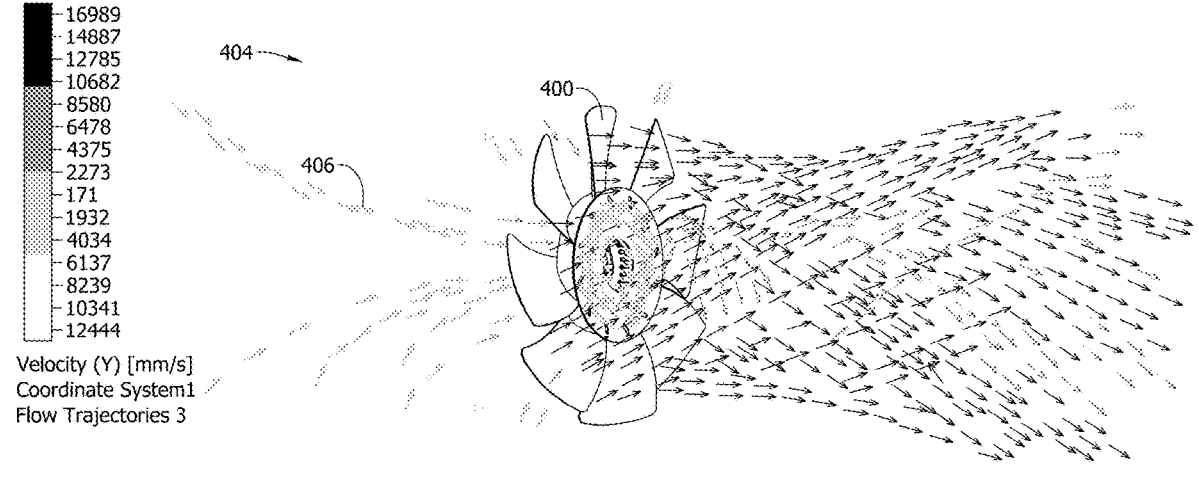
FIG. 4B shows air flow of the fan assembly based on computer simulation data.

FIGS. 4A and 4B show an example fan assembly 400 that includes motor assembly 100. FIG. 4A is a perspective view of fan assembly 400. In the example embodiment, fan assembly 400 includes one or more blades 402. Blades 402 are coupled to motor assembly 100. In operation, blades 402 are driven by motor assembly 100 and rotate.

In the example embodiment, blades 402 are curved with curvature oriented in one direction, such as clockwise (FIG. 4A) or counterclockwise, when viewing toward first cover 118. The orientation of curvature of fins 120 of motor assembly 100 is the same as the orientation of curvature of blades 402. In this case, the airflows from fins 120 and blades 402 combine to form an increased axial combine, thereby streamlining and strengthening the air flow. The blades 402 may also be formed to generate a radial airflow. In this case, the airflows from the fins 120 and blades also combine.

FIG. 4B shows computer simulation of an example air flow 404 for fan assembly 400. Arrows 406 represent velocity vectors of air. The shading of arrows represent the relative speed of air flow. As shown, the magnitudes of the velocity vectors increase as the air flow passes through the narrow space around stator 104 and exits from motor assembly 100. Air flow guided by fins 120 of motor assembly 100 is in the same general direction as the air flow driven by the blades, thereby efficiently cooling the motor and directing the air flow for the use of fan assembly 400.

Figure 5:
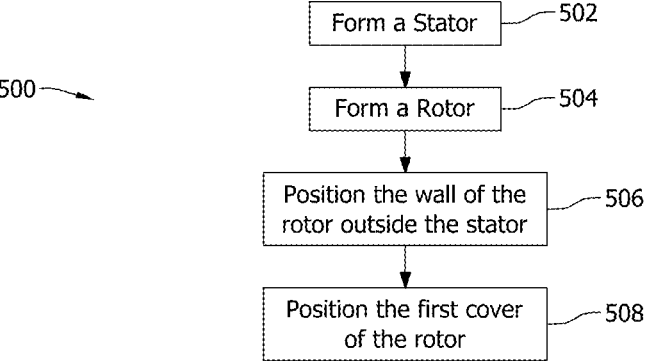
FIG. 5 is a flow chart of an example method of assembling the motor assemblies shown in FIGS. 1A-3.

FIG. 5 is a flow chart of an example method 500 of assembling a motor assembly. In the example embodiment, method 500 includes forming 502 a stator. Example stators may be stators 104 described herein. Method 500 also includes forming 504 a rotor. Example rotors may be rotors 106 described herein. Method 500 further includes positioning 506 the wall of the rotor outside the stator. In addition, method 500 includes positioning 508 first cover 118 of rotor 106 such that fins 120 are received in cavity 112.

The design of fins 120 may be optimized via computer simulation. For example, a 3D model (see FIG. 4B) of air flow and/or heat is built as functions of parameters of fins 120, such as the number of fins, dimensions, orientations, curvatures, shapes, spacing between neighboring fins, material of the fins, and/or other parameters. The parameters are adjusted to optimize the performance of motor assembly 100 to meet a pre-defined condition. The predefined condition may be a condition that heat is below a threshold level or that the air volume is maximized. For example, the heat exiting from motor assembly 100 may be limited to a desired threshold such that motor assembly 100 is not damaged from the heat during operation. In another example, motor assembly 100 is optimized to achieve the most volume of air being moved at a certain speed of the motor assembly 100 by optimizing the parameters.

Figure 6:
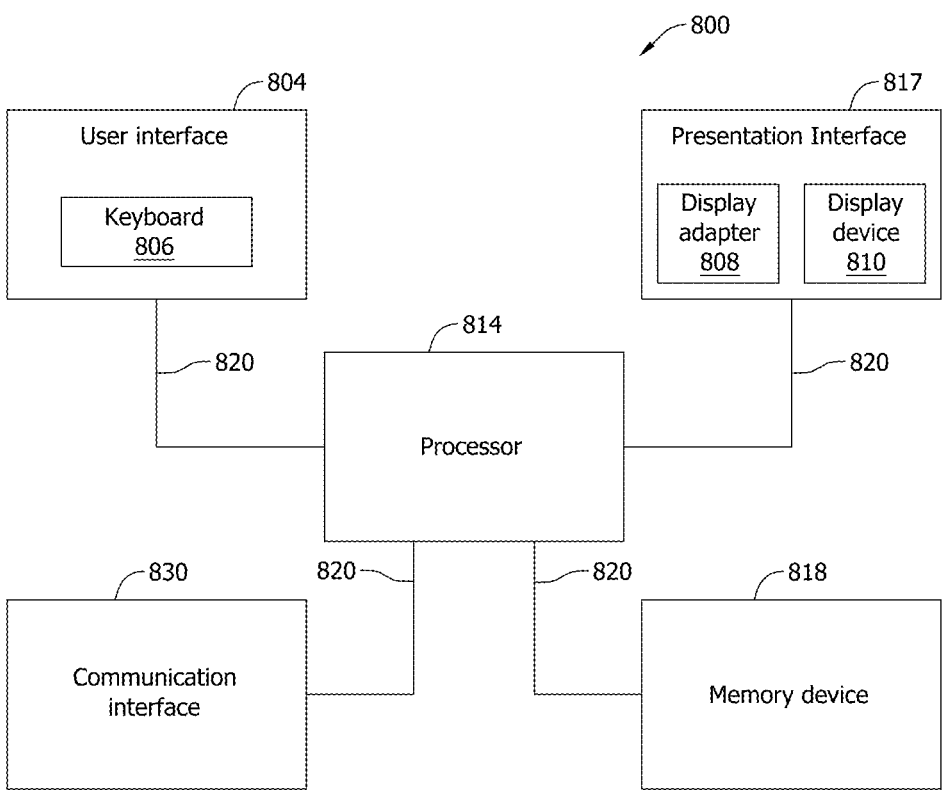
FIG. 6 is a block diagram of an example user computer device.

At least parts of methods described herein may be implemented in any suitable computer device 800 and software implemented therein. FIG. 6 is a block diagram of an example computer device 800. In the example embodiment, computer device 800 includes a user interface 804 that receives at least one input from a user. User interface 804 may include a keyboard 806 that enables the user to input pertinent information. User interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the example embodiment, computer device 800 includes a presentation interface 817 that presents information, such as input events and/or validation results, to the user. Presentation interface 817 may also include a display adapter 808 that is coupled to at least one display device 810. More specifically, in the example embodiment, display device 810 may be a visual display device, such as a cathode ray tube (CRT), a liquid crystal display (LCD), a light-emitting diode (LED) display, and/or an "electronic ink" display. Alternatively, presentation interface 817 may include an audio output device (e.g., an audio adapter and/or a speaker) and/or a printer.

Computer device 800 also includes a processor 814 and a memory device 818. Processor 814 is coupled to user interface 804, presentation interface 817, and memory device 818 via a system bus 820. In the example embodiment, processor 814 communicates with the user, such as by prompting the user via presentation interface 817 and/or by receiving user inputs via user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are for illustration purposes only, and thus are not intended to limit in any way the definition and/or meaning of the term "processor."

In the example embodiment, memory device 818 includes one or more devices that enable information, such as executable instructions and/or other data, to be stored and retrieved. Moreover, memory device 818 includes one or more computer readable media, such as, without limitation, dynamic random access memory (DRAM), static random access memory (SRAM), a solid state disk, and/or a hard disk. In the example embodiment, memory device 818 stores, without limitation, application source code, application object code, configuration data, additional input events, application states, assertion statements, validation results, and/or any other type of data. Computer device 800, in the example embodiment, may also include a communication interface 830 that is coupled to processor 814 via system bus 820. Moreover, communication interface 830 is communicatively coupled to data acquisition devices.

In the example embodiment, processor 814 may be programmed by encoding an operation using one or more executable instructions and providing the executable instructions in memory device 818. In the example embodiment, processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Figure 7:
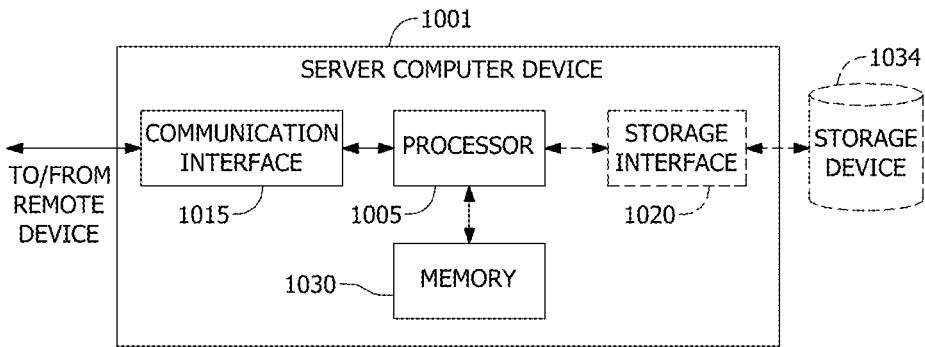
FIG. 7 is a block diagram of an example server computer device.

At least parts of methods described herein may also be implemented with a server computer device 1001. FIG. 7 illustrates an example configuration of a server computer device 1001. Server computer device 1001 also includes a processor 1005 for executing instructions. Instructions may be stored in a memory area 1030, for example. Processor 1005 may include one or more processing units (e.g., in a multi-core configuration).

Processor 1005 is operatively coupled to a communication interface 1015 such that server computer device 1001 is capable of communicating with a remote device or another server computer device 1001. For example, communication interface 1015 may receive data from system 12, via the Internet.

Processor 1005 may also be operatively coupled to a storage device 1034. Storage device 1034 is any computer-operated hardware suitable for storing and/or retrieving data. In some embodiments, storage device 1034 is integrated in server computer device 1001. For example, server computer device 1001 may include one or more hard disk drives as storage device 1034. In other embodiments, storage device 1034 is external to server computer device 1001 and may be accessed by a plurality of server computer devices 1001. For example, storage device 1034 may include multiple storage units such as hard disks and/or solid state disks in a redundant array of independent disks (RAID) configuration. storage device 1034 may include a storage area network (SAN) and/or a network attached storage (NAS) system.

In some embodiments, processor 1005 is operatively coupled to storage device 1034 via a storage interface 1020. Storage interface 1020 is any component capable of providing processor 1005 with access to storage device 1034. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1005 with access to storage device 1034.

At least one technical effect of the systems and methods described herein includes (a) fins positioned in an existing cavity of a motor to increase heat dissipation; and (b) apertures defined on covers of the motor to streamline air flow through the motor.

Example embodiments of motor assemblies and methods of assembling motor assemblies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An outer rotor electric motor assembly for industrial applications comprising:

a stator comprising a stator core defining a cavity; and a rotor comprising a wall having a first end, a second end, and one or more magnets aligned along the wall, the wall positioned outside the stator, the rotor defining an axis of rotation, the rotor further comprising:

a first cover coupled with the wall at the first end, the first cover defining a first plurality of apertures arranged circumferentially about the axis of rotation at a first radial distance from the axis of rotation, and the first cover comprising one or more fins positioned on the first cover at a second radial distance from the axis of rotation, a second cover positioned at the second end, the second cover defining a second plurality of apertures arranged along the outer periphery of the second cover, the apertures being a third radial distance from the axis of rotation when the second cover is coupled to the wall, wherein:

the one or more fins are received in the cavity, and the second radial distance is larger than the first radial distance and less than the third radial distance.

2. The outer rotor electric motor assembly of claim 1, wherein the one or more fins are curved.

3. The outer rotor electric motor assembly of claim 1, wherein the one or more fins are straight.

4. The outer rotor electric motor assembly of claim 1, wherein the rotor further comprises an end cover, the wall extending from the end cover, the end cover defining the first plurality of apertures, and the second cover and the end cover positioned opposite one another with the stator positioned therebetween.

5. The outer rotor electric motor assembly of claim 4, wherein the second cover is coupled with the stator.

6. The outer rotor electric motor assembly of claim 1, further comprising a plurality of stators, wherein the plurality of stators are aligned axially and define a gap between neighboring stators.

7. The outer rotor electric motor assembly of claim 1, wherein the one or more fins are axially aligned with one another.

8. The outer rotor electric motor assembly of claim 1, wherein the fins extend directly from the first cover.

9. The outer rotor electric motor assembly of claim 1, wherein air is drawn into the outer rotor electric motor assembly through the first plurality of apertures, directed radially outward through the cavity toward the stator, and ejected axially through the second plurality of apertures.

10. A method of assembling an outer rotor electric motor assembly for industrial applications comprising:

forming a stator including a stator core, the stator core defining a cavity;

forming a rotor including a wall having a first end, a second end, and one or more magnets aligned along the wall, the rotor defining an axis of rotation, the rotor further including a first cover coupled to the wall at the first end, the first cover comprising one or more fins positioned on the first cover at a second radial distance from the axis of rotation, and the first cover defining a first plurality of apertures arranged circumferentially about the axis of rotation at a first radial distance from the axis of rotation;

forming a second cover, the second cover defining a second plurality of apertures arranged along the outer periphery of the second cover, the apertures being a third radial distance from the axis of rotation when the second cover is coupled to the wall, positioning the wall outside the stator;

positioning the first cover such that the one or more fins are received in the cavity, and positioning the second cover at the second end, wherein:

the second radial distance is larger than the first radial distance and less than the third radial distance.

11. The method of claim 10, wherein the one or more fins are optimized by:

adjusting one or more parameters of the one or more fins such that a predefined condition is met.

12. The method of claim 10, wherein the one or more fins are curved.

13. The method of claim 10, wherein the one or more fins are straight.

14. The method of claim 10, wherein the rotor further includes an end cover, the wall extending from the end cover, the end cover defining the first plurality of apertures, and the method further comprising:

positioning a second cover opposite the end cover with the stator positioned therebetween.

15. The method of claim 14, further comprising:

coupling the second cover with the stator.

16. The method of claim 10, further comprising:

forming a plurality of stators; and aligning the plurality of stators axially with a gap between neighboring stators.

17. The method of claim 10, wherein the one or more fins are axially aligned with one another.

18. The method of claim 10, wherein the fins extend directly from the first cover.

19. A fan assembly for industrial applications comprising:

an outer rotor electric motor assembly comprising:

a stator comprising a stator core defining a cavity; and a rotor comprising a wall having a first end, a second end, and one or more magnets aligned along the wall, the wall positioned outside the stator, the rotor defining an axis of rotation, the rotor further comprising:

a first cover coupled with the wall at a first end, the first cover defining a first plurality of apertures arranged circumferentially about the axis of rotation at a first radial distance from the axis of rotation, and the first cover comprising one or more fins positioned on the first cover at a second radial distance from the axis of rotation, a second cover positioned at the second end, the second cover defining a second plurality of apertures arranged along the outer periphery of the second cover, the apertures being a third radial distance from the axis of rotation when the second cover is coupled to the wall, wherein:

the one or more fins are received in the cavity, and the second radial distance is larger than the first radial distance and less than the third radial distance; and one or more blades coupled with the outer rotor electric motor assembly.

20. The fan assembly of claim 19, wherein the one or more fins are curved, the one or more blades are curved, and curvature of the one or more fins and curvature of the one or more blades are oriented in the same direction.

* * * * *